(12) United States Patent
Inoue

(10) Patent No.: US 10,752,135 B2
(45) Date of Patent: Aug. 25, 2020

(54) VEHICLE SEAT WITH CHILD SEAT ATTACHMENT

(71) Applicant: TOYOTA BOSHOKU KABUSHIKI KAISHA, Aichi-ken (JP)

(72) Inventor: Takuya Inoue, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/275,781

(22) Filed: Feb. 14, 2019

(65) Prior Publication Data

US 2019/0255974 A1     Aug. 22, 2019

(30) Foreign Application Priority Data

Feb. 16, 2018  (JP) ................................. 2018-026115

(51) Int. Cl.
*B60N 2/28* (2006.01)
*B60N 2/68* (2006.01)

(52) U.S. Cl.
CPC ........... *B60N 2/2893* (2013.01); *B60N 2/682* (2013.01)

(58) Field of Classification Search
CPC ..... B60N 2/2893; B60N 2/2887; B60N 2/682
USPC ....................................................... 297/253
See application file for complete search history.

(56) References Cited

U.S. PATENT DOCUMENTS

| 6,361,115 B1 * | 3/2002 | Aufrere | ................ B60N 2/2821 297/216.11 |
| 7,533,934 B2 * | 5/2009 | Foelster | ............... B60N 2/2893 297/253 |

FOREIGN PATENT DOCUMENTS

| JP | 2001-206125 | 7/2001 |
| JP | 3690228 | 6/2005 |

* cited by examiner

*Primary Examiner* — Milton Nelson, Jr.
(74) *Attorney, Agent, or Firm* — Greenblum & Bernstein, P.L.C.

(57) ABSTRACT

A vehicle seat to which a child seat is capable of being fixed, the vehicle seat including: a first fixture and a second fixture which are disposed while being spaced apart from each other in a seat-width direction, wherein the first fixture includes: a first engaging portion including first and second end parts and configured to be engageable with a first connector provided to the child seat, the first and second end parts being positioned on opposite sides from each other in the seat-width direction; a first leg portion including a first root part; and a second leg portion including a second root part, and wherein a center position in the seat-width direction of the first engaging portion and a center position in the seat-width direction between the first root part and the second root part are different from each other in the seat-width direction.

5 Claims, 3 Drawing Sheets

VEHICLE SEAT WITH CHILD SEAT ATTACHMENT

CROSS-REFERENCE TO RELATED APPLICATIONS

This application claims priority from Japanese Patent Application No. 2018-026115 filed on Feb. 16, 2018, the entire contents of which are incorporated herein by reference.

TECHNICAL FIELD

The disclosure relates to a vehicle seat.

BACKGROUND

As disclosed in Japanese Patent No. 3690228, ISO-FIX is known as a method for fixing a child seat on a vehicle seat. In the ISO-FIX method, a pair of connectors is provided to the child seat, and a pair of fixtures is provided to the vehicle seat. For example, the pair of fixtures is disposed between a seat cushion and a seat back. A space in a seat-width direction between the pair of fixtures is defined by ISO (International Organization for Standardization).

Each of the pair of fixtures disclosed in Japanese Patent No. 3690228 includes an engaging portion engageable with the connectors of the child seat and a pair of leg portions provided at both ends of the engaging portion. Each of the pair of fixtures has substantially a U-shape as a whole. A rod-shaped member extending in the seat-width direction is provided below the seat back, and the pair of leg portions are welded to the rod-shaped member. A center position in the seat-width direction between the parts of the pair of leg portions which are welded to the rod-like member coincides with the center position in the seat-width direction of the engaging portion.

As described above, the space in the seat-width direction between the pair of fixtures is defined by ISO. Since the fixture disclosed in Japanese Patent No. 3690228 has a configuration in which the above-described center positions are coincident with each other, a layout restriction to be considered between the fixture and the frame or the like provided around the fixture is large. Therefore, for example, even if it is attempted to change the designed space between left and right side frames in the seat frame, it is difficult to respond flexibly to such a design change when the fixture disclosed in Japanese Patent No. 3690228 is adopted.

SUMMARY

An aspect of the present disclosure is to provide a vehicle seat having a configuration capable of responding flexibly to design changes.

An aspect of the present disclosure provides a vehicle seat to which a child seat is capable of being fixed, the vehicle seat including: a seat cushion; a seat back; a seat frame which forms a framework of the seat back and the seat cushion; and a first fixture and a second fixture which are fixed to the seat frame and disposed while being spaced apart from each other in a seat-width direction, wherein the first fixture is configured to be engageable with a first connector provided to the child seat and the second fixture is configured to be engageable with a second connector provided to the child seat, wherein the first fixture includes: a first engaging portion including a first end part and a second end part, provided at a position apart from the seat frame, and configured to be engageable with the first connector, the first end part and the second end part being positioned on opposite sides from each other in the seat-width direction; a first leg portion including a first root part fixed to the seat frame and extending so as to connect the first root part and the first end part; and a second leg portion including a second root part fixed to the seat frame and extending so as to connect the second root part and the second end part, and wherein a center position in the seat-width direction of the first engaging portion and a center position in the seat-width direction between the first root part and the second root part are different from each other in the seat-width direction.

According to the vehicle seat having the above configuration, since the center position in the seat-width direction of the first engaging portion and the center position in the seat-width direction between the first root part and the second root part are different from each other in the seat-width direction, it is possible to respond flexibly to design changes of a seat body.

DETAILED DESCRIPTION

Figure 1:
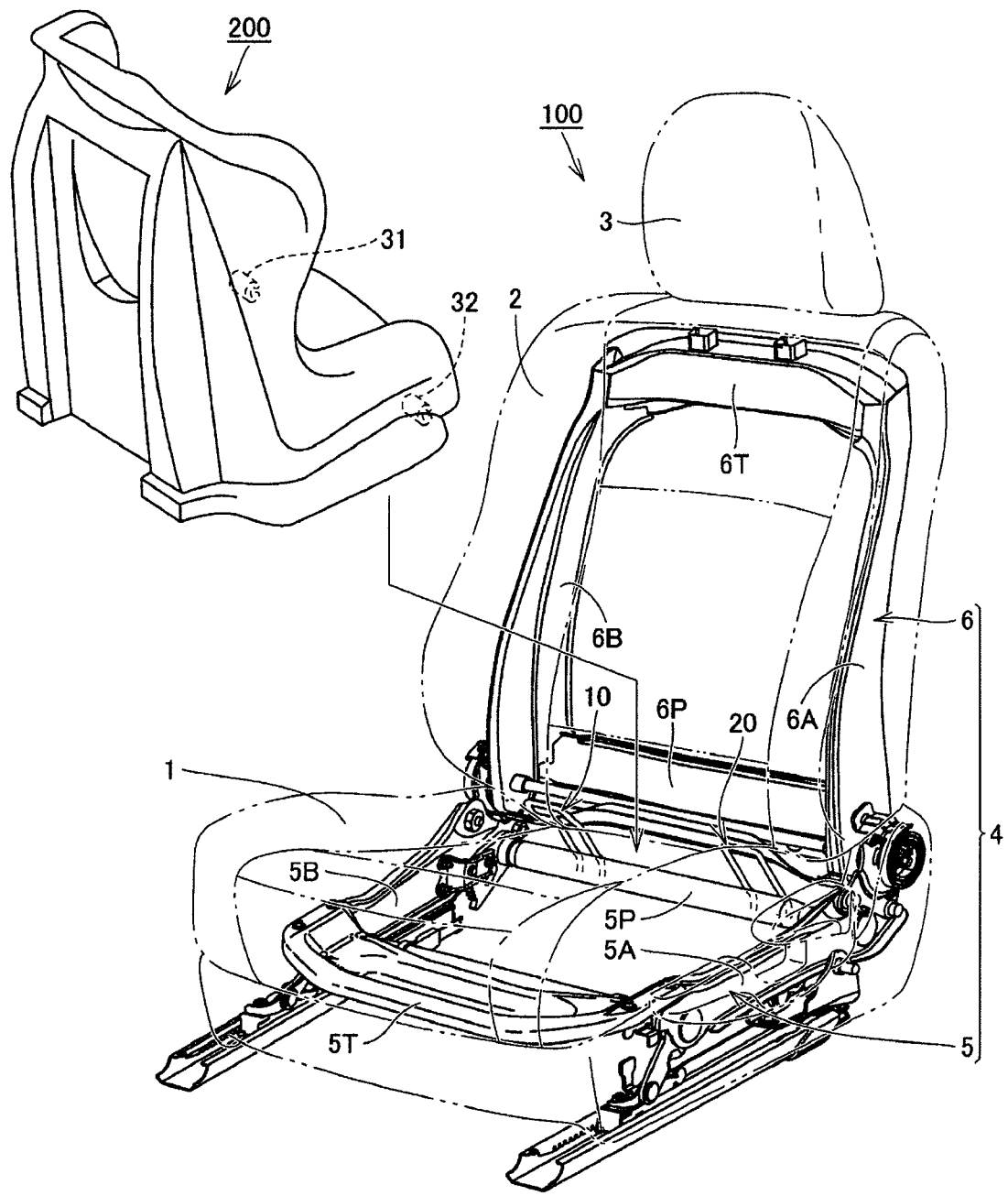
FIG. 1 is a perspective view showing a vehicle seat 100 according to an embodiment of the disclosure.

Hereinafter, the embodiment of the vehicle seat will be described with reference to the drawings. In the following description, same parts and corresponding parts are given the same reference numerals, and duplicate explanation may not be repeated.

(Vehicle Seat 100)

FIG. 1 is a perspective view showing a vehicle seat 100 according to the embodiment. As shown in FIG. 1, the vehicle seat 100 includes a seat cushion 1, a seat back 2, a headrest 3, a seat frame 4, a first fixture 10, and a second fixture 20.

The seat frame 4 includes a cushion frame 5 and a back frame 6, and forms a framework of the seat cushion 1 and the seat back 2. The cushion frame 5 is provided in the seat cushion 1, and is configured by side frames 5A, 5B, a front panel 5T, and a rear pipe 5P. The back frame 6 is provided in the seat back 2 and is configured by side frames 6A, 6B, an upper panel 6T, and a lower panel 6P.

The rear pipe 5P extends along a seat-width direction, and the first fixture 10 and the second fixture 20 are welded to the rear pipe 5P. The first fixture 10 and the second fixture 20 are disposed while being spaced apart from each other in the seat-width direction. The lower panel 6P also extends along the seat-width direction. Here, the first fixture 10 and the second fixture 20 may be welded to the lower panel 6P.

Figure 2:
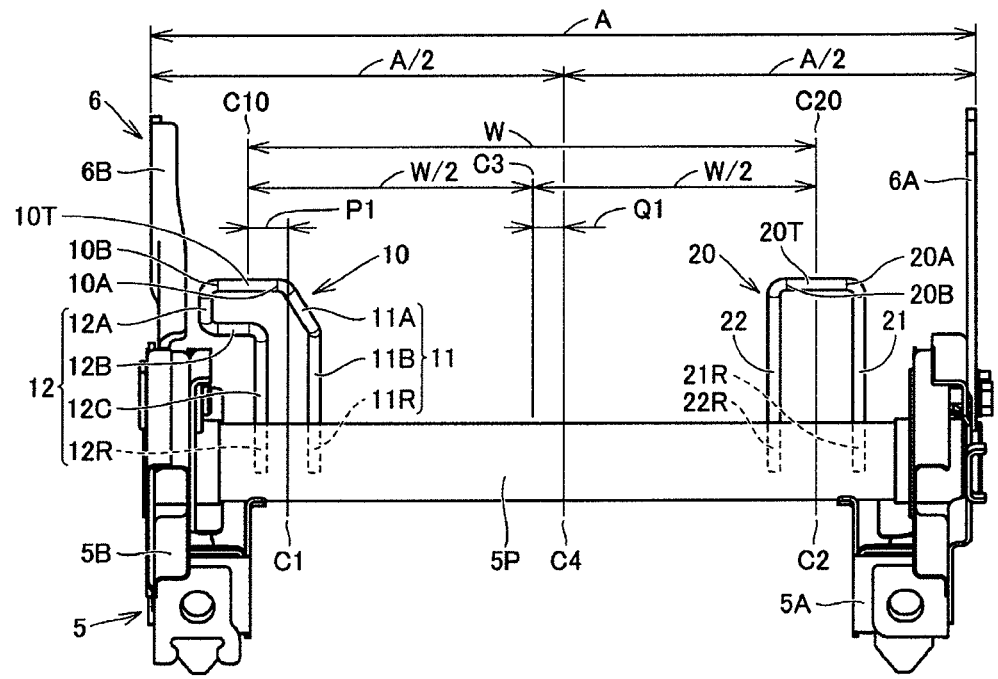
FIG. 2 is a front view showing a cushion frame 5, a back frame 6, a first fixture 10, and a second fixture 20 provided in the vehicle seat 100 according to the embodiment of the disclosure.

The first fixture 10 is configured to be engageable with a first connector 31 provided to a child seat 200. The second fixture 20 is configured to be engageable with a second connector 32 provided to the child seat 200. FIG. 2 is a front view showing the cushion frame 5, the back frame 6, the first fixture 10 and the second fixture 20 provided in the vehicle seat 100 according to the embodiment.

(First Fixture 10)

As shown in FIG. 2, the first fixture 10 includes a first engaging portion 10T, a first leg portion 11, and a second leg portion 12. The first engaging portion 10T has a columnar shape, is provided at a position apart from the seat frame 4 (here, the rear pipe 5 P), and extends along the seat-width direction. The first engaging portion 10T includes a first end part 10A and a second end part 10B, and the first end part 10A and the second end part 10B are positioned on opposite sides from each other in the seat-width direction. The first engaging portion 10T is engageable with the first connector 31 provided to the child seat 200 (FIG. 1).

The first leg portion 11 includes a first extension part 11A, a first linear part 11B, and a first root part 11R. The first root part 11R is a part of the first leg portion 11 which is fixed to the seat frame 4 (here, the rear pipe 5P), and the first leg portion 11 extends so as to connect the first root part 11R and the first end part 10A. The first linear part 11B extends in a direction orthogonal to the seat-width direction from a position of the first root part 11R.

The first extension part 11A extends from a part of the first linear part 11B positioned on the opposite side of the first root part 11R in a direction intersecting the orthogonal direction (direction orthogonal to the seat-width direction). The first extension part 11A extends away from the second fixture 20 as the first extension part 11A extends away from the first root part 11R. The first extension part 11A extends in an oblique direction that intersects a seat front-rear direction and the seat-width direction. An end part of the first extension part 11A opposite to the first linear part 11B is connected to the first end part 10A of the first engaging portion 10T.

The second leg portion 12 includes an upper linear part 12A, a second extension part 12B, a second linear part 12C, and a second root part 12R. The second root portion 12R is a portion of the second leg portion 12 which is fixed to the seat frame 4 (here, the rear pipe 5P), and the second leg portion 12 extends so as to connect the second root part 12R and the second end part 10B. The second linear part 11C extends from a position of the second root part 12R in a direction parallel to the first linear part 11B.

The second extension part 12B extends from a part of the second linear part 12C positioned on the opposite side of the second root part 12R in a direction intersecting the orthogonal direction (direction orthogonal to the seat-width direction). The second extension part 12B extends away from the second fixture 20 as the second extension part 12B extends away from the second root part 12R. The second extension part 12B extends in a direction parallel to the seat-width direction.

The upper linear part 12A extends in the direction orthogonal to the seat-width direction from a part of the second extension part 12B positioned on an opposite side to the second linear part 12C. An end part of the upper linear part 12A opposite to the second extension part 12B is connected to the second end part 10B of the first engaging portion 10T.

The first engaging portion 10T has a center position C10 in the seat-width direction. The center position C10 is a part positioned exactly at the center between the first end portion 10A and the second end portion 10B of the first engaging portion 10T. In the present embodiment, the center position C10 of the first engaging portion 10T and a center position C1 in the seat-width direction between the first root part 11R and the second root part 12R are different from each other in the seat-width direction. The center position C10 is provided at a position closer to the outside in the seat-width direction than the center position C1 by a dimension P1.

(Second Fixture 20)

The second fixture 20 includes a second engaging portion 20T, a first leg portion 21, and a second leg portion 22, and has substantially a U-shape as a whole. The second engaging portion 20T has a columnar shape, is provided at a position apart from the seat frame 4 (here, the rear pipe 5P), and extends along the seat-width direction. The second engaging portion 20T includes a first end part 20A and a second end part 20B, and the first end part 20A and the second end part 20B are positioned on opposite sides from each other in the seat-width direction. The second engaging portion 20T is engageable with the second connector 32 provided to the child seat 200 (FIG. 1).

The first leg portion 21 includes a first root part 21R. The first root part 21R is a part of the first leg portion 21 which is fixed to the seat frame 4 (here, the rear pipe 5P), and the first leg portion 21 extends so as to connect the first root part 21R and the first end part 20A. The first leg portion 21 extends in the direction orthogonal to the seat-width direction from a position of the first root part 21R. An end part of the first leg portion 21 opposite to the first root part 21R is connected to the first end part 20A of the second engaging portion 20T.

The second leg portion 22 includes a second root part 22R. The second root part 22R is a part of the second leg portion 22 which is fixed to the seat frame 4 (here, the rear pipe 5P), and the second leg portion 22 extends so as to connect the second root part 22R and the second end part 20B. The second leg portion 22 extends in the direction orthogonal to the seat-width direction from the position of the second root part 22R. An end part of the second leg portion 22 opposite to the second root part 22R is connected to the second end part 20B of the second engaging portion 20T.

The second engaging portion 20T has a center position C20 in the seat-width direction. The center position C20 is a part positioned exactly at the center between the second end portion 20A and the second end portion 20B of the second engaging portion 20T. In the present embodiment, the center position C20 and a center position C2 in the seat-width direction between the first root part 21R and the second root part 22R are provided at a same position in the seat-width direction.

The first engaging portion 10T of the first fixture 10 and the second engaging portion 20T of the second fixture 20 are disposed with a space W therebetween in the seat-width direction. A center position C3 is defined between the first engaging portion 10T and the second engaging portion 20T. The center position C3 is positioned exactly at the center between the first engaging portion 10T and the second engaging portion 20T in the seat-width direction.

(Back Frame 6)

The side frames 6A and 6B of the back frame 6 are disposed with a space A therebetween in the seat-width direction. A center position C4 is defined between the side frames 6A and 6B. The center position C4 is positioned exactly in the center of the side frames 6A and 6B in the seat-width direction and corresponds to the center position in the seat-width direction of the seat cushion 1. In the present embodiment, the center position C3 in the seat-width direction between the first engaging portion 10T and the second engaging portion 20T and the center position C4 in the seat-width direction of the seat cushion 1 are different from each other in the seat-width direction. The center positions C3 and C4 are provided to be different from each other in the seat-width direction by a dimension Q1.

In the vehicle seat 100 configured as described above, the first connector 31 and the second connector 32 of the child seat 200 (FIG. 1) are engaged with the first fixture 10 and the second fixture 20, respectively, so that the child seat 200 can be easily attached to the vehicle seat 100. Hereinafter, the function and effect obtained from the vehicle seat 100 will be described in detail while comparing with a comparative example.

Comparative Example

Figure 3:
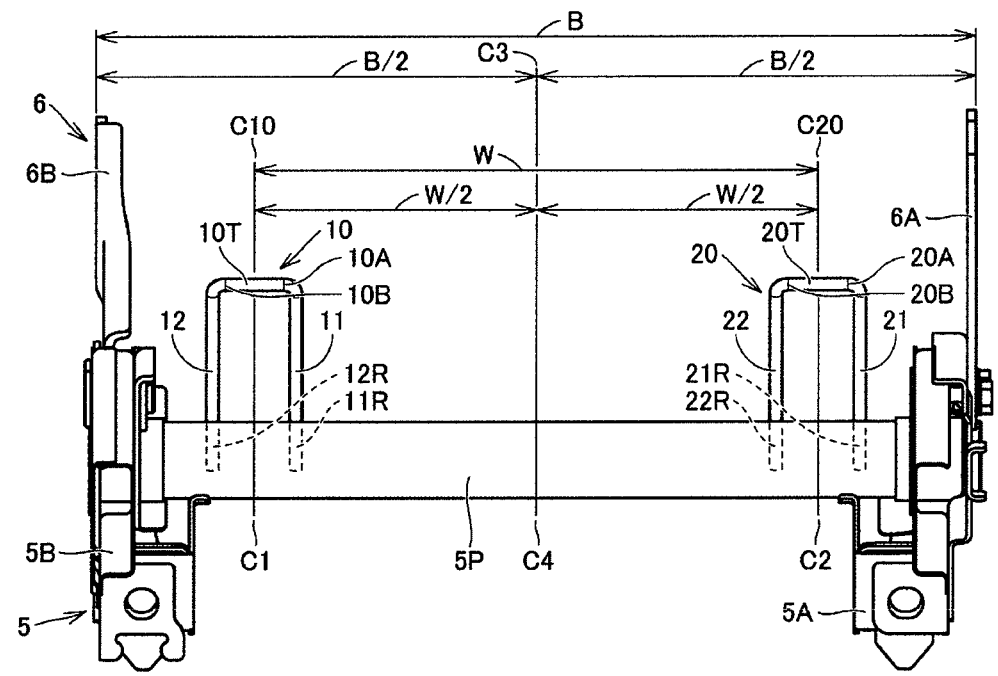
FIG. 3 is a front view showing the cushion frame 5, the back frame 6, the first fixture 10 and the second fixture 20 provided in a vehicle seat in a comparative example.

FIG. 3 is a front view showing the cushion frame 5, the back frame 6, the first fixture 10 and the second fixture 20 provided in a vehicle seat in the comparative example. The above-described embodiment and the comparative example differ in the following points. In the comparative example, the first fixture 10 includes the first engaging portion 10T, the first leg portion 11, and the second leg portion 12, and has a substantially U-shaped configuration as a whole. The first fixture 10 has the same configuration as the second fixture 20.

The first leg portion 11 extends in the direction orthogonal to the seat-width direction from a position of the first root part 11R. An end part opposite to the first root part 11R in the first leg portion 11 is connected to the first end part 10A of the first engaging portion 10T. The second leg portion 12 extends in the direction orthogonal to the seat-width direction from a position of the second root part 12R. An end part opposite to the second root part 12R in the second leg portion 12 is connected to the second end part 10B of the second engaging portion 10T.

In the comparative example, the center position C10 of the first engaging portion 10T and the center position C1 in the seat-width direction between the first root part 11R and the second root part 12R are provided at the same position in the seat-width direction. Meanwhile, also in the comparative example, the first engaging portion 10T of the first fixture 10 and the second engaging portion 20T of the second fixture 20 are disposed with a space W therebetween in the seat-width direction. A center position C3 is defined between the first engaging portion 10T and the second engaging portion 20T.

The side frames 6A, 6B of the back frame 6 are disposed with a space B in the seat-width direction. The center position C4 is defined between the side frames 6A and 6B. The center position C4 is positioned exactly in the center of the side frames 6A and 6B in the seat-width direction and corresponds to the center position in the seat-width direction of the seat cushion 1. The center position C3 between the first engaging portion 10T and the second engaging portion 20T and the center position C4 in the seat-width direction of the seat cushion 1 are provided at the same position in the seat-width direction in the comparative example.

Comparison Between the Embodiment and the Comparative Example

In the case of the comparative example (FIG. 3), in order to dispose the first fixture 10 and the second fixture 20 with a space W therebetween, the side frames 6A and 6B of the back frame 6 are disposed with a space B in the seat-width direction. In the case of the embodiment (FIG. 2), in order to dispose the first fixture 10 and the second fixture 20 with a space W therebetween, the side frames 6A and 6B of the back frame 6 are disposed with a space A in the seat-width direction. For the reasons described below, the space A can be set smaller than the space B.

As stated at the beginning, the space W in the seat-width direction between the first fixture 10 and the second fixture 20 is defined by ISO. A range in which the first fixture 10 and the second fixture 20 can be disposed is defined based on the configuration of the side frames 6A and 6B, and the first fixture 10 and the second fixture 20 are disposed within the range. In the case of the comparative example, since the configuration in which the center positions C1 and C10 coincide with each other is adopted in the first fixture 10, the layout restriction to be considered between the first fixture 10 and the side frame 6B provided around the first fixture 10 is large.

That is, in order to narrow the space B in the structure of the comparative example shown in FIG. 3, it is conceivable to dispose the side frames 6A, 6B inside the position shown in FIG. 3. However, when the space between the side frames 6A and 6B is narrowed while maintaining the space W defined by ISO, as the possibilities that the side frame 6A interferes with the second fixture 20 and the side frame 6B interferes with the first fixture 10 increase, it is also conceivable to perform design changes in the side frames 6A and 6B. However, such design changes are not easy.

On the other hand, in the configuration of the embodiment shown in FIG. 2, for example, it is possible to adopt the space A narrower than the space B. In the case of the embodiment, the center position C10 of the first engaging portion 10T and the center position C1 in the seat-width direction between the first root part 11R and the second root part 12R are different from each other in the seat-width direction. The center position C10 is provided at a position closer to the outside than the center position C1 by a dimension P1 in the seat-width direction.

For example, the space A can be realized by arranging the side frame 6B at a position close to the first fixture 10. Even if the side frame 6B is disposed at a position close to the first fixture 10, the second root part 12R of the second leg portion 12 and the first root part 11R of the first leg portion 11 are disposed at positions closer to the inside in the seat-width direction with respect to the position of the first engaging portion 10T. Even if the side frame 6B is disposed at a position closer to the inside while keeping the space W defined by ISO, the increase in possibility of the side frame 6B interfering with the first fixture 10 can be effectively suppressed. As a result, the space A can be set smaller than the space B.

In particular, the first extension part 11A extends away from the second fixture 20 as the first extension part 11A extends away from the first root part 11R. That is, the first extension part 11A extends so as to be positioned on the outer side in the seat-width direction as the first extension part 11A moves away from the first root part 11R. Likewise for the second extension part 12B, the second extension part 12B extends away from the second fixture 20 as the second extension part 12B extends away from the second root part 12R (so as to be positioned on the outer side in the seat-width direction).

Although these configurations are not indispensable, according to these configurations, the first linear part 11B, the first root part 11R, the second linear part 12C, and the second root part 12R are located closer to the inside in the seat-width direction. Therefore, even if the side frame 6B is disposed at a position closer to the inside while keeping the space W defined by ISO, the increase in possibility of the side frame 6B interfering with the first fixture 10 can be effectively suppressed. As a result, the space A can be set smaller than the space B.

When realizing a configuration in which the center positions C10 and C1 are different from each other in the seat-width direction, for example, a method of fixing the first root part 11R to the rear pipe 5P and fixing the second root part 12R to the side frame 6B may be adopted. On the other hand, in the present embodiment, since both the first root part 11R of the first fixture 10 and the second root part 12R of the first fixture 10 are fixed to the rear pipe 5P which is the same member, compared with the case where the first root part 11R and the second root part 12R are fixed between different members, it is possible to increase the positional accuracy of the first engaging portion 10T and also eliminate the need for an additional component such as a reinforcing bracket.

As described above, in the first fixture 10 of the present embodiment, the first leg portion 11 includes the first linear part 11B. The first linear part 11B extends in the direction orthogonal to the seat-width direction from the position of the first root part 11R. Although this configuration is not indispensable, by adopting this configuration, it is possible to weld the first leg portion 11 to the rear pipe 5P easily in a state where the first leg portion 11 is positioned with high accuracy with respect to the rear pipe 5P.

As described above, in the first fixture 10 of the present embodiment, the second leg portion 12 has the second linear part 12C. The second extension part 12C extends in the direction parallel to the first linear part 11B (the direction orthogonal to the seat-width direction) from the position of the second root part 12R. Although this configuration is not indispensable, by adopting this configuration, it is possible to weld the second leg portion 12 to the rear pipe 5P easily in a state where the second leg portion 12 is positioned with high accuracy with respect to the rear pipe 5P.

As described above, in the present embodiment, the first extension part 11A extends in the oblique direction intersecting the seat front-rear direction and the seat-width direction. This configuration is not indispensable, and for example, the first fixture 10 may also be configured like a first fixture 10 shown in FIG. 4.

Figure 4:
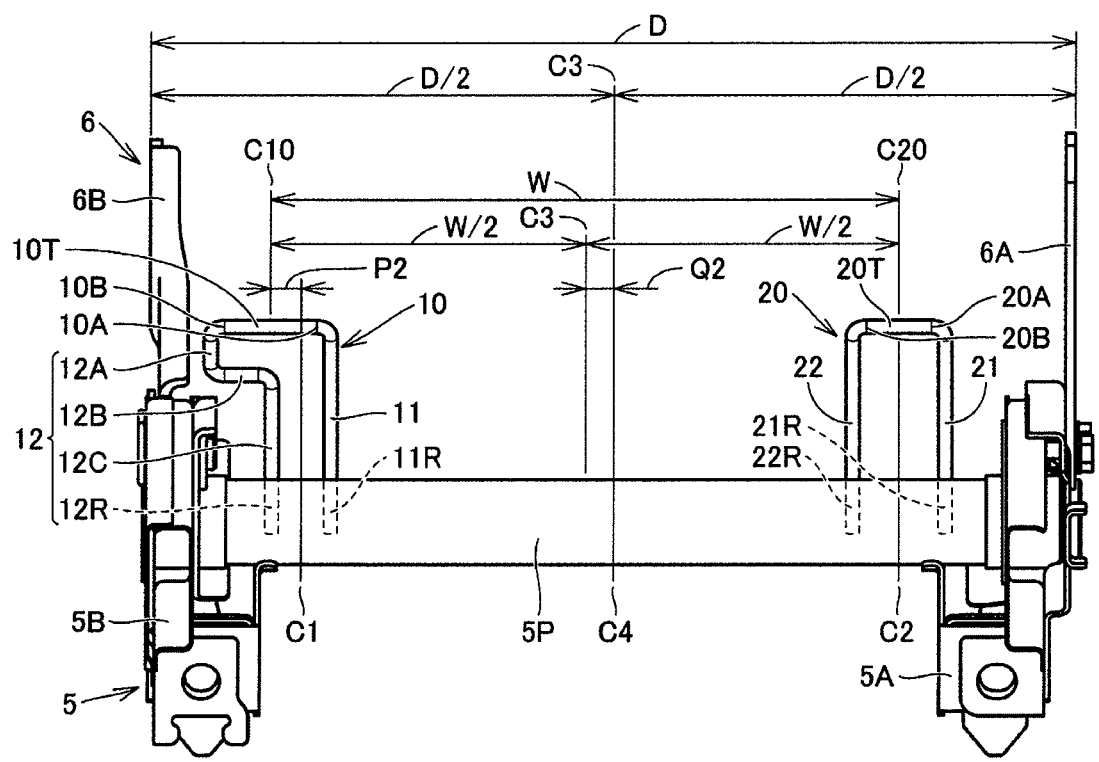
FIG. 4 is a front view showing the cushion frame 5, the back frame 6, the first fixture 10 and the second fixture 20 provided in the vehicle seat 100 in a modified example of the embodiment of the disclosure.

FIG. 4 is a front view showing the cushion frame 5, the back frame 6, the first fixture 10 and the second fixture 20 provided in the vehicle seat 100 according to a modified example of the embodiment. The first fixture 10 shown in FIG. 4 includes a first engaging portion 10T, a first leg portion 11, and a second leg portion 12, and the first leg portion 11 extends in the direction orthogonal to the seat-width direction from a position of the first root part 11R. The end part opposite to the first root part 11R in the first leg portion 11 is connected to the first end part 10A of the first engaging portion 10T. The length of the first engaging portion 10T shown in FIG. 4 is longer than the length of the first engaging portion 10T shown in FIG. 2.

Also in the configuration shown in FIG. 4, the center position C10 of the first engagement portion 10T and the center position C1 in the seat-width direction between the first root part 11R and the second root part 12R are different from each other in the seat-width direction. Therefore, even if the side frame 6B is disposed at a position closer to the inside while keeping the space W defined by ISO, the increase in possibility of the side frame 6B interfering with the first fixture 10 can be effectively suppressed as compared with the case of the comparative example.

Here, the center position C10 of the first engaging portion 10T shown in FIG. 4 is provided at a position closer to the outside than the center position C1 by a dimension P2 in the seat-width direction. The dimension P2 shown in FIG. 4 is smaller than the dimension P1 shown in FIG. 2. In the configuration shown in FIG. 2, by providing the first extension part 11A in the first leg portion 11, the center position C10 of the first engaging portion 10T can be disposed outside in the seat-width direction than the center position C10 of the first engaging portion 10T shown in FIG. 4. In other words, in the case of FIG. 4, since the first extension part 11A is not provided in the first leg portion 11, the center position C10 of the first engaging portion 10T is disposed more inside than the center position C10 of the first engaging portion 10T shown in FIG. 2 in the seat-width direction.

Therefore, in order to maintain the space W, it is necessary that the first fixture 10 shown in FIG. 4 is disposed as a whole on the outer side than the configuration shown in FIG. 2 in the seat-width direction. In the case of the configuration shown in FIG. 4, the side frames 6A and 6B of the back frame 6 are disposed with a space D therebetween in the seat-width direction. The center position C3 in the seat-width direction between the first engaging portion 10T and the second engaging portion 20T and the center position C4 in the seat-width direction of the seat cushion 1 are provided to be different from each other by a dimension Q2 in the seat-width direction.

The dimension Q2 shown in FIG. 4 is smaller than the dimension Q1 shown in FIG. 2. Since the first extension part 11A is provided in the first leg portion 11 shown in FIG. 2, the space A shown in FIG. 2 can be set to a value smaller than the space D shown in FIG. 4. Therefore, according to the vehicle seat 100 having the configuration shown in FIG. 2, it is possible to secure a space W defined by ISO between the first fixture 10 and the second fixture 20 in a narrower range so that it is possible to construct a narrower vehicle seat.

Although the embodiment has been described above, the disclosure is illustrative in all respects and is not restrictive. The technical scope of the invention is indicated according to the claims, and it is intended that meanings equivalent to the claims and all modifications within the scope of the claims are included.

The disclosure provides illustrative, non-limiting examples as follows:

An aspect of the present disclosure provides a vehicle seat to which a child seat is capable of being fixed, the vehicle seat including: a seat cushion; a seat back; a seat frame which forms a framework of the seat back and the seat cushion; and a first fixture and a second fixture which are fixed to the seat frame and disposed while being spaced apart from each other in a seat-width direction, wherein the first fixture is configured to be engageable with a first connector provided to the child seat and the second fixture is configured to be engageable with a second connector provided to the child seat, wherein the first fixture includes: a first engaging portion including a first end part and a second end part, provided at a position apart from the seat frame, and configured to be engageable with the first connector, the first end part and the second end part being positioned on opposite sides from each other in the seat-width direction; a first leg portion including a first root part fixed to the seat frame and extending so as to connect the first root part and the first end part; and a second leg portion including a second root part fixed to the seat frame and extending so as to connect the second root part and the second end part, and wherein a center position in the seat-width direction of the first engaging portion and a center position in the seat-width direction between the first root part and the second root part are different from each other in the seat-width direction.

In the above-described vehicle seat, it is preferable that the first leg portion includes: a first linear part which extends from a position of the first root part in a direction orthogonal to the seat-width direction; and a first extension part which extends from a part of the first linear part positioned on an opposite side of the first root part in a direction intersecting the orthogonal direction.

In the above-described vehicle seat, it is preferable that the second leg portion includes: a second linear part which extends from a position of the second root part in a direction parallel to the first linear part; and a second extension part which extends from a part of the second linear part positioned on an opposite side of the second root part in a direction intersecting the orthogonal direction.

In the above-described vehicle seat, it is preferable that the first extension part extends away from the second fixture as the first extension part extends away from the first root part, and the second extension part extends away from the second fixture as the second extension part extends away from the second root part.

In the above-described vehicle seat, it is preferable that the first extension part extends in an oblique direction intersecting a seat front-rear direction and the seat-width direction, and the second extension part extends in a direction parallel to the seat-width direction.

In the above-described vehicle seat, it is preferable that the second fixture includes a second engaging portion, the second engaging portion is provided at a position apart from the seat frame and is configured to be engageable with the second connecting member, and a center position in the seat-width direction between the first engaging portion and the second engaging portion and a center position in the seat-width direction of the seat cushion are different from each other in the seat-width direction.

According to the vehicle seat having the above configuration, since the center position in the seat-width direction of the first engaging portion and the center position in the seat-width direction between the first root part and the second root part are different from each other in the seat-width direction, it is possible to respond flexibly to design changes of a seat body.

What is claimed is:

1. A vehicle seat to which a child seat is capable of being fixed, the vehicle seat comprising:
    a seat cushion;
    a seat back;
    a seat frame which forms a framework of the seat back and the seat cushion; and
    a first fixture and a second fixture which are fixed to the seat frame and disposed while being spaced apart from each other in a seat-width direction,
    wherein the first fixture is configured to be engageable with a first connector provided to the child seat and the second fixture is configured to be engageable with a second connector provided to the child seat,
    wherein the first fixture includes:
        a first engaging portion including a first end part and a second end part, provided at a position apart from the seat frame, and configured to be engageable with the first connector, the first end part and the second end part being positioned on opposite sides from each other in the seat-width direction;
        a first leg portion including a first root part fixed to the seat frame and extending so as to connect the first root part and the first end part; and
        a second leg portion including a second root part fixed to the seat frame and extending so as to connect the second root part and the second end part, and
    wherein a center position in the seat-width direction of the first engaging portion and a center position in the seat-width direction between the first root part and the second root part are different from each other in the seat-width direction,
    wherein the second fixture includes a second engaging portion,
    wherein the second engaging portion is provided at a position apart from the seat frame and is configured to be engageable with the second connecting member, and
    wherein a center position in the seat-width direction between the first engaging portion and the second engaging portion and a center position in the seat-width direction of the seat cushion are different from each other in the seat-width direction.

2. The vehicle seat according to claim 1,
    wherein the first leg portion includes:
        a first linear part which extends from a position of the first root part in a direction orthogonal to the seat-width direction; and
        a first extension part which extends from a part of the first linear part positioned on an opposite side of the first root part in a direction intersecting the orthogonal direction.

3. The vehicle seat according to claim 2,
    wherein the second leg portion includes:
        a second linear part which extends from a position of the second root part in a direction parallel to the first linear part; and
        a second extension part which extends from a part of the second linear part positioned on an opposite side of the second root part in a direction intersecting the orthogonal direction.

4. The vehicle seat according to claim 3,
    wherein the first extension part extends away from the second fixture as the first extension part extends away from the first root part, and
    wherein the second extension part extends away from the second fixture as the second extension part extends away from the second root part.

5. A vehicle seat to which a child seat is capable of being fixed, the vehicle seat comprising:
    a seat cushion;
    a seat back;
    a seat frame which forms a framework of the seat back and the seat cushion; and
    a first fixture and a second fixture which are fixed to the seat frame and disposed while being spaced apart from each other in a seat-width direction,
    wherein the first fixture is configured to be engageable with a first connector provided to the child seat and the second fixture is configured to be engageable with a second connector provided to the child seat,
    wherein the first fixture includes:
        a first engaging portion including a first end part and a second end part, provided at a position apart from the seat frame, and configured to be engageable with the first connector, the first end part and the second end part being positioned on opposite sides from each other in the seat-width direction;
        a first leg portion including a first root part fixed to the seat frame and extending so as to connect the first root part and the first end part; and a second leg portion including a second root part fixed to the seat frame and extending so as to connect the second root part and the second end part, and wherein a center position in the seat-width direction of the first engaging portion and a center position in the seat-width direction between the first root part and the second root part are different from each other in the seat-width direction, wherein the first leg portion includes:

a first linear part which extends from a position of the first root part in a direction orthogonal to the seat-width direction; and a first extension part which extends from a part of the first linear part positioned on an opposite side of the first root part in a direction intersecting the orthogonal direction, wherein the second leg portion includes:

a second linear part which extends from a position of the second root part in a direction parallel to the first linear part; and a second extension part which extends from a part of the second linear part positioned on an opposite side of the second root part in a direction intersecting the orthogonal direction, wherein the first extension part extends away from the second fixture as the first extension part extends away from the first root part, wherein the second extension part extends away from the second fixture as the second extension part extends away from the second root part, wherein the first extension part extends in an oblique direction intersecting a seat front-rear direction and the seat-width direction, and wherein the second extension part extends in a direction parallel to the seat-width direction.

* * * * *